(12) United States Patent
Hill et al.

(10) Patent No.: US 6,862,801 B2
(45) Date of Patent: Mar. 8, 2005

(54) SYSTEMS, APPARATUS AND METHODS FOR ISOLATING, COMPRESSING AND/OR RETAINING THE STRUCTURE OF A FUEL CELL STACK

(75) Inventors: Graham Edward Hill, Vancouver (CA); Ross William Johnston Bailey, Vancouver (CA); Rae Hartwell, Surrey (CA); Uwe Pfister, Leutenbach (DE)

(73) Assignee: Ballard Power Systems Inc., Burnaby (CA)

( * ) Notice: Subject to any disclaimer, the term of this patent is extended or adjusted under 35 U.S.C. 154(b) by 638 days.

(21) Appl. No.: 09/999,178

(22) Filed: Nov. 30, 2001

(65) Prior Publication Data

US 2003/0104260 A1 Jun. 5, 2003

(51) Int. Cl.⁷ .............................................. H01M 2/02
(52) U.S. Cl. ...................... 29/730; 29/623.1; 29/623.2; 429/32; 429/35
(58) Field of Search .................... 429/32, 35; 29/623.1, 29/623.2, 730

(56) References Cited

U.S. PATENT DOCUMENTS

| | | | |
|---|---|---|---|
| 4,218,526 A | 8/1980 | DiGiacomo et al. | 429/138 |
| 4,642,274 A | 2/1987 | Tsutsumi et al. | 429/35 |
| 4,842,962 A | 6/1989 | Bass | 429/12 |
| 5,213,909 A | 5/1993 | Takashima et al. | 429/26 |
| 5,258,242 A | 11/1993 | Dean et al. | 429/54 |
| 5,324,565 A | 6/1994 | Leonida et al. | 428/131 |
| 5,409,787 A | 4/1995 | Blanyer et al. | 429/66 |
| 5,629,104 A | 5/1997 | Crawford, Sr. et al. | 429/34 |
| 5,741,605 A * | 4/1998 | Gillett et al. | 429/31 |
| 5,789,091 A | 8/1998 | Wozniczka et al. | 429/12 |
| 5,993,987 A | 11/1999 | Wozniczka et al. | 429/37 |
| 6,001,502 A | 12/1999 | Walsh | 429/34 |
| 6,194,095 B1 * | 2/2001 | Hockaday | 429/34 |
| 6,218,039 B1 * | 4/2001 | Mease et al. | 429/37 |
| 6,596,427 B1 * | 7/2003 | Wozniczka et al. | 429/32 |
| 6,740,442 B1 * | 5/2004 | Itoh | 429/32 |

FOREIGN PATENT DOCUMENTS

| | | |
|---|---|---|
| EP | 0 989 618 A1 | 3/2000 |
| EP | 1045468 A8 | 10/2000 |
| JP | 02 049360 | 2/1990 |
| JP | 09 092324 | 4/1997 |
| WO | WO 97/44846 | 11/1997 |
| WO | WO 02/27836 A2 | 4/2002 |

* cited by examiner

*Primary Examiner*—Bruce F. Bell
(74) *Attorney, Agent, or Firm*—Seed IP Law Group PLLC (57) ABSTRACT

A receptacle having an end cap, a pliable sidewall, and a fastener, for receiving and retaining a fuel cell stack in its stacked configuration during fabrication of a multi-stack fuel cell assembly, is shown and described. Methods of fabricating the assembly include stacking the fuel cell in the receptacle, compressing the fuel cell, and engaging the fastener to retain the stack in its stacked configuration and, or to retain the stack under at least partial compression.

39 Claims, 7 Drawing Sheets

SYSTEMS, APPARATUS AND METHODS FOR ISOLATING, COMPRESSING AND/OR RETAINING THE STRUCTURE OF A FUEL CELL STACK

BACKGROUND OF THE INVENTION

1. Field of the Invention

The present invention relates to electrochemical energy converters with polymer electrolyte membranes, such as fuel cells or electrolyzer cells or stacks of such cells. In particular, the present invention relates to systems and methods for assembling, compressing, isolating, and/or retaining stacks during and/or following fabrication.

2. Description of the Related Art

Electrochemical cells comprising polymer electrolyte membranes ("PEM"s) may be operated as fuel cells wherein a fuel and an oxidant are electrochemically converted at the cell electrodes to produce electrical power, or as electrolyzers wherein an external electrical current is passed between the cell electrodes, typically through water, resulting in generation of hydrogen and oxygen at the respective electrodes. FIGS. 1–4 collectively illustrate typical designs of a conventional membrane electrode assembly 5, an electrochemical cell 10 comprising a PEM layer 2, and a stack 100 of such cells.

Figure 1:
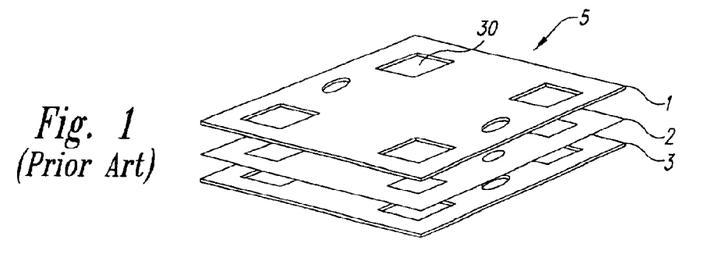
FIG. 1 is an exploded isometric view of a membrane electrode assembly according to the prior art.

Each cell 10 comprises a membrane electrode assembly ("MEA") 5 such as that illustrated in an exploded view in FIG. 1. MEA 5 comprises an ion-conducting PEM layer 2 interposed between first and second electrode layers 1/3 which are typically porous and electrically conductive, and each of which comprises an electrocatalyst at its interface with the PEM layer for promoting the desired electrochemical reaction. The electrocatalyst generally defines the electrochemically active area of the cell. The MEA 5 is typically consolidated as a bonded, laminated assembly.

Figure 2:
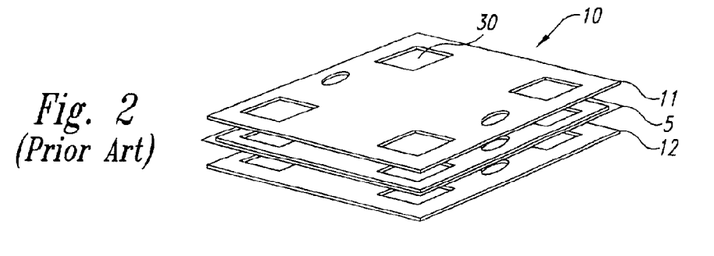
FIG. 2 is an exploded isometric view of an electrochemical cell according to the prior art.

In an individual cell 10, illustrated in an exploded view in FIG. 2, an MEA 5 is interposed between first and second cell separator plates 11/12, which are typically fluid impermeable and electrically conductive. The cell separator plates 11/12 are are manufactured from non-metals, such as graphite; from metals, such as certain grades of steel or surface treated metals; or from electrically conductive plastic composite materials.

Fluid flow spaces, such as passages or chambers, are provided between the cell separator plates 11, 12 and the adjacent electrode layers 1, 3 to facilitate access of reactants to the electrode layers and removal of products. Such spaces may, for example, be provided by means of spacers between the separator plates 11, 12 and the corresponding electrode layers 1, 3, or by provision of a mesh or porous fluid flow layer between the cell separator plates and corresponding electrode layers. More commonly, channels are formed in the faces of the cell separator plates 11, 12 that face the electrode layers 1, 3. Cell separator plates 11, 12 comprising such channels are commonly referred to as fluid flow field plates. In conventional cells 10, resilient gaskets or seals are typically provided around the perimeter of the flow fields between the faces of the MEA 5 and each of the cell separator plates 11, 12 to prevent leakage of fluid reactant and product streams.

Electrochemical cells 10 with ion-conductive PEM layers 2, sometimes called PEM cells, are advantageously stacked to form a stack 100 (see FIG. 4) comprising a plurality of cells disposed between first and second end plates 17, 18. A compression mechanism is typically employed to hold the cells 10 tightly together, to maintain good electrical contact between components, and to compress the seals. In the embodiment illustrated in FIG. 3, each cell 10 comprises a pair of cell separator plates 11, 12 in a configuration with two cell separator plates per MEA 5. Cooling spaces or layers may be provided between some or all of the adjacent pairs of cell separator plates 11, 12 in the stack 100. An alternate configuration (not shown) has a single separator plate, or "bipolar plate," interposed between a pair of MEAs 5 contacting the cathode of one cell and the anode of the adjacent cell, thus resulting in only one separator plate per MEA 5 in the stack 100 (except for the end cell). Such a stack 100 may comprise a cooling layer interposed between every few cells 10 of the stack, rather than between each adjacent pair of cells.

Figure 3:
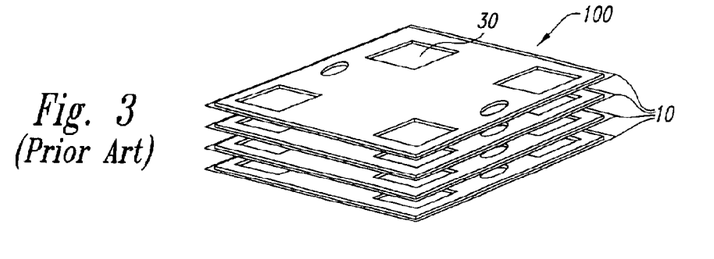
FIG. 3 is an exploded isometric view of an electrochemical cell stack according to the prior art.
Figure 4:
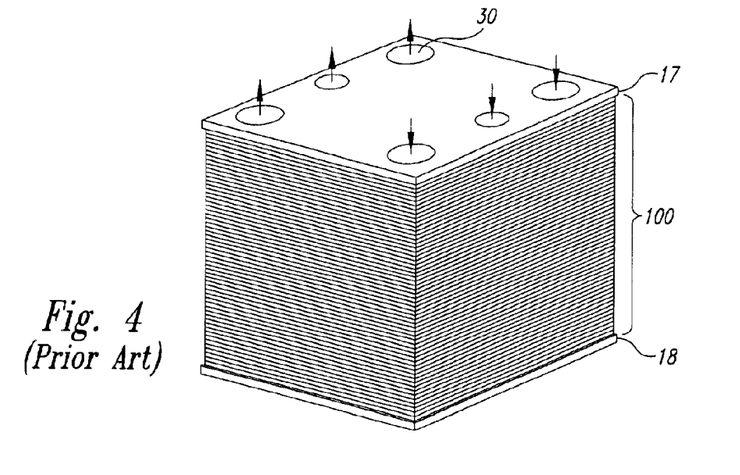
FIG. 4 is an isometric view of an electrochemical cell stack according to the prior art.

The illustrated cell elements have openings 30 formed therein which, in the stacked assembly, align to form fluid manifolds for supply and exhaust of reactants and products and, if cooling spaces are provided, for a cooling medium. Again, resilient gaskets or seals are typically provided between the faces of the MEA 5 and each of the cell separator plates 11, 12 around the perimeter of these fluid manifold openings 30 to prevent leakage and intermixing of fluid streams in the operating stack 100.

BRIEF SUMMARY OF THE INVENTION

The present invention relates to apparatus, systems and methods for use in fabricating fuel cell stacks and multi-stack fuel cell assemblies. In one embodiment, the present invention incorporates a receptacle for receiving and retaining a fuel cell stack in its stacked configuration during fabrication of the multi-stack fuel cell assembly. The receptacle has an end cap, a pliable sidewall, and a fastener. The end cap has a plurality of openings configured to allow the fuel cell stack to communicate with a corresponding plurality of openings in a manifold and/or to electrically connect the fuel cell stack to other stacks in a multi-stack assembly. The pliable sidewall is sized and shaped to electrically insulate the fuel cell stack from at least one adjacent fuel cell stack when the multi-stack fuel cell has been assembled. The fastener is configured to extend from one location on the sidewall across the end of the fuel cell stack opposite the end cap, and to be attached to another location on the sidewall to retain the fuel cell stack in its stacked configuration. In particular embodiments, the sidewall can be coupled to the end cap, the sidewall can be sized to extend around at least substantially the entire perimeter of a fuel cell stack, the fastener can be a single band, the fastener can be a number of bands, or the fastener can be a portion of the sidewall itself. Other variations are also appreciated. The receptacle can be configured to retain the fuel cell stack in its stacked configuration, and, or can be configured to be tensioned around at least a portion of a compressed stack and adhered thereto to retain the stack under at least partial compression.

Another embodiment of the present invention is directed toward a method for fabricating a fuel cell stack. The method incorporates placing a stack of fuel cell elements in an open end of a pliable bag having the open end, an opposing closed end and a sidewall therebetween; compressing the fuel cell stack; extending a length of material over the compressed stack and across the open end of the bag; and attaching the length of material to the bag to retain the fuel cell stack in its stack configuration. Embodiments of this invention can be configured to retain the stack under at least partial compression.

Still another embodiment of the present invention is directed toward a method for assembling a plurality of fuel cells. The method incorporates compressing each of the fuel cell stacks; wrapping a pliable material around each of the stacks of fuel cells to retain the stacks in their stacked configuration; and placing the plurality of stacks between a pair of manifolds. Embodiments of this invention can be configured to insulate each fuel cell stack from adjacent fuel cell stacks, and, or to retain the fuel cell stacks under at least partial compression during assembly. Embodiments of this invention can also incorporate leak testing each fuel cell stack prior to assembly.

DETAILED DESCRIPTION OF THE INVENTION

The present detailed description is generally directed toward methods, systems, and apparatus for facilitating the stacking and compression of fuel cell stacks, and the assembly of multi-stack fuel cell assemblies. Various embodiments of the present invention can allow a fuel cell stack to be fabricated and compressed, then sealed in its compressed form for ease of handling and subsequent assembly. Further, embodiments of the invention can isolate adjacent fuel cell stacks in a multi-stack assembly to reduce the potential for electrical shorts. Still further, pre-compression of independent fuel cell stacks can allow the stacks to be leak tested prior to assembly into the multi-stack assembly.

Many specific details of certain embodiments of the invention are set forth in the following description and illustrated in FIGS. 5–14 to provide a thorough understanding of such embodiments. Once skilled in the art, however, will understand that the present invention may have additional embodiments, or may be practiced without several of the details described in the following description.

Figure 5:
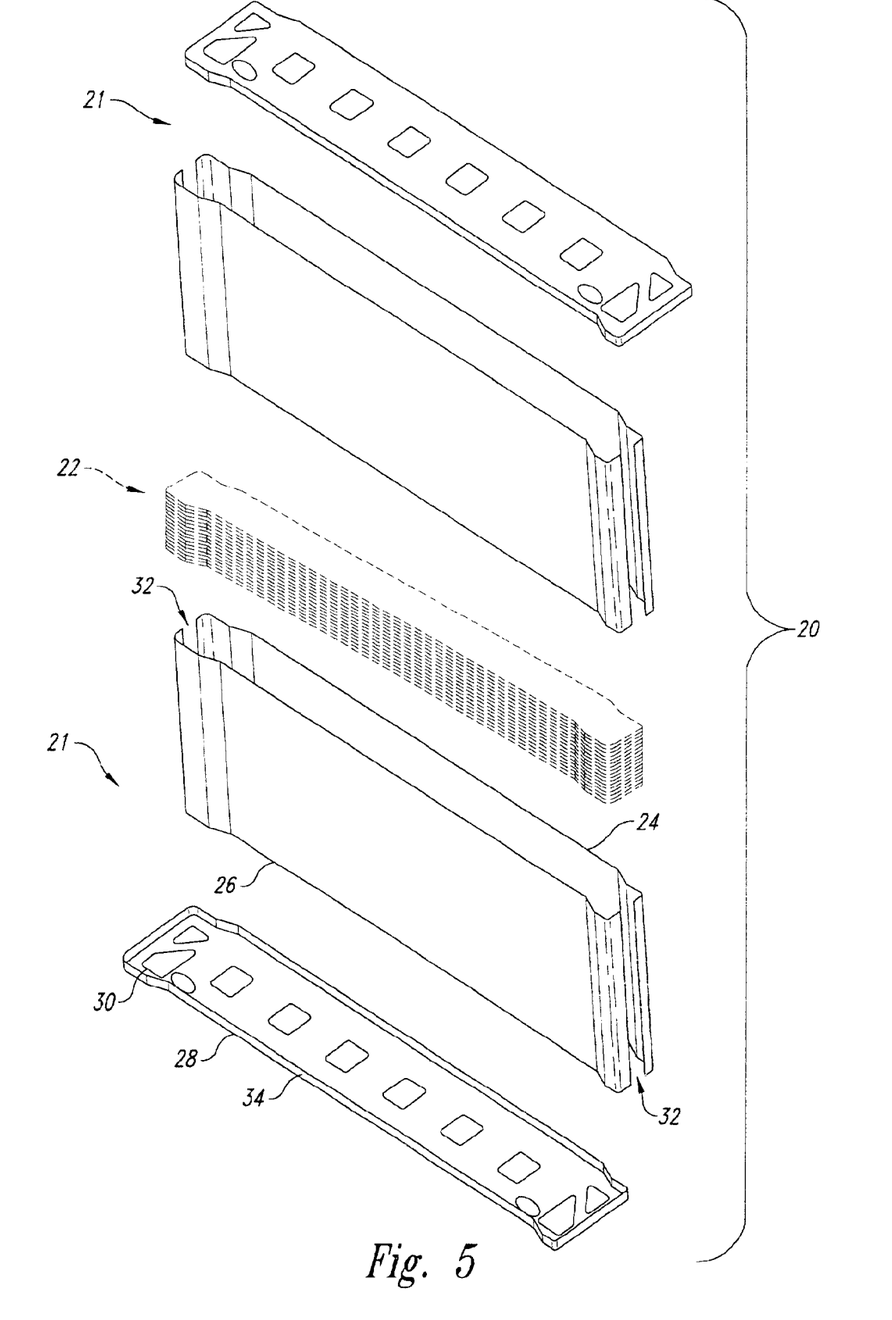
FIG. 5 is an exploded isometric view of a receptacle according to an embodiment of the present invention.

FIG. 5 generally illustrates a receptacle assembly 20 according to one particular embodiment of the present invention. The receptacle assembly 20 incorporates a pair of opposing end assemblies 21 that engage a fuel cell stack 22 from opposing ends during use. In the illustrated embodiment, the end assemblies 21 are substantially identical to each other. Accordingly, the description of one end assembly 21 will serve to describe both end assemblies except where specifically described otherwise.

The end assembly 21 is fabricated from a convex sidewall 24, a concave sidewall 26, and an end cap 28. The convex sidewall 24 and concave sidewall 26 can be fabricated from a thin, insulative material such as LEXAN or a similar material, and can be thermoplastically deformed to conform to a corresponding wall of the fuel cell stack 22. Alternatively, convex sidewall 24 and concave sidewall 26 can be fabricated from an elastic insulative material that is capable of deforming to conform to a corresponding wall of the fuel cell stack 22. The end cap 28 can also be fabricated from an insulative material such as LEXAN, and can be vacuum formed to conform with an end of the fuel cell stack 22. The end cap 28 can contain a number of openings 30 configured to align with ports on the fuel cell stack 22 or to vent the receptacle assembly 20 during compression as discussed below. The opening configuration of FIG. 5 is one particular example, but the inventor appreciates that the configuration can and will likely vary for each particular application.

Each of the sidewalls 24, 26 is slightly taller than one-half of the height of a fuel cell stack 22. Consequently, when the end assemblies 21 are engaged with the fuel cell stack 22 from opposing ends, the concave sidewalls 26 overlap each other and the convex sidewalls 24 overlap each other. The respective lengths of the sidewalls 24, 26 can vary without deviating from the spirit of the invention.

The convex sidewall 24 approaches the concave sidewall 26 at opposing gaps 32 aligned with the ends of the fuel cell stack 22. In the illustrated embodiment, the gaps 32 extend along the entire height of the end assembly 21. The sizes and placements of the gaps 32 can vary and the gaps could be replaced with openings or other suitable features without deviating from the spirit of the invention.

Figure 6:
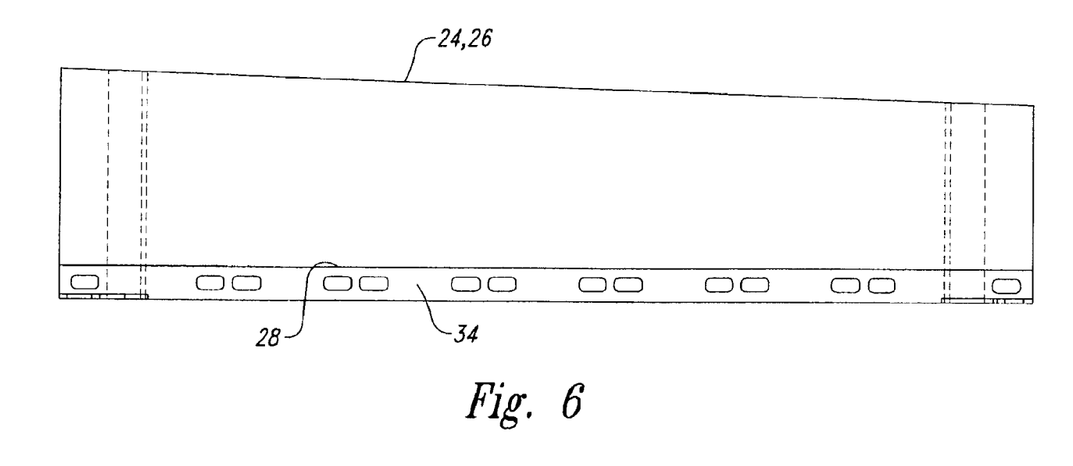
FIG. 6 is an elevation view of a lower portion of the receptacle of FIG. 5.
Figure 7:
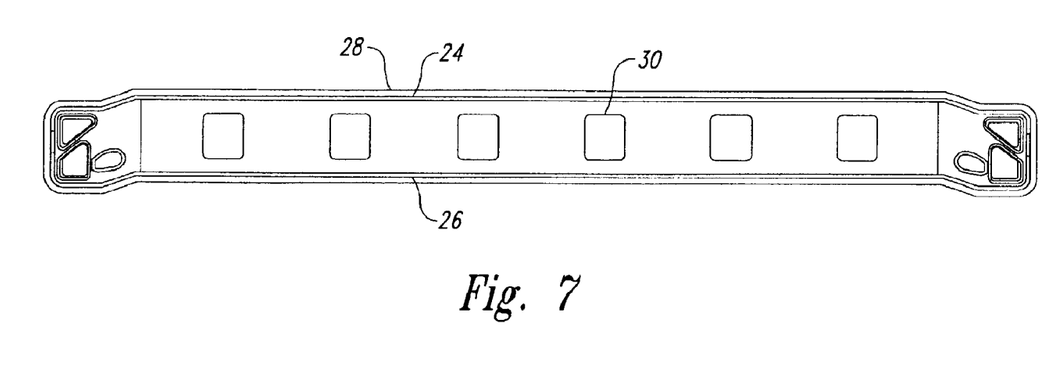
FIG. 7 is a top view of the portion of the receptacle of FIG. 6.
Figure 8:
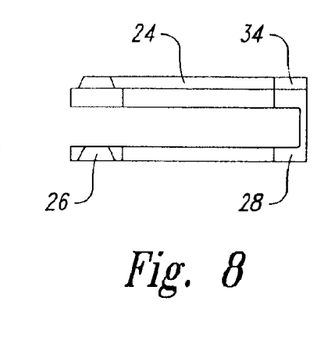
FIG. 8 is an end view of the portion of the receptacle of FIG. 6.

FIGS. 6–8 further illustrate one particular end assembly 21 according to this embodiment of the present invention. When the end assembly 21 is assembled, the convex sidewall 24 and the concave sidewall 26 are each abutted against the end cap 28 and positioned internal to a raised rim 34 extending around the perimeter of the end cap. The sidewalls 24, 26 are attached to the end cap 28, such as by high frequency welding or other suitable means. The inventor appreciates that the exact nature of the engagement between the sidewalls 24, 26 and the end caps 28 can vary without deviating from the spirit of the present invention.

Figure 9:
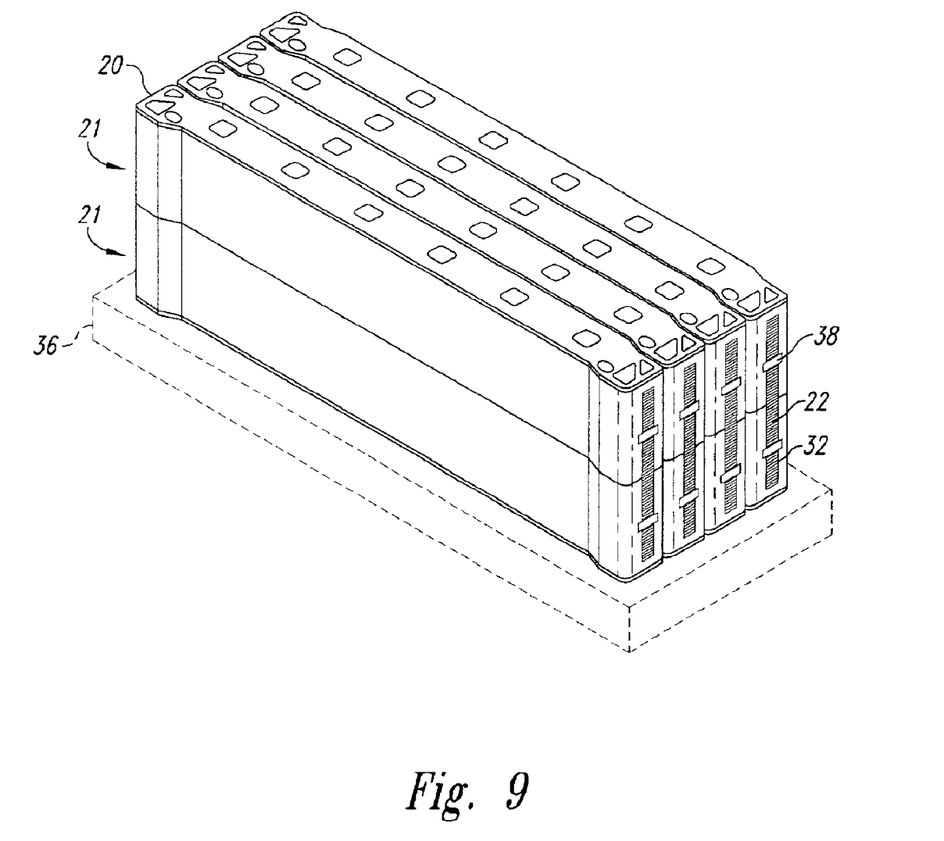
FIG. 9 is an isometric view of four assembled receptacles and fuel cell stacks according to the embodiment of FIG. 5.

FIG. 9 illustrates four receptacle assemblies 20 engaged with a manifold 36 according to this particular embodiment of the present invention. Prior to being configured as such, each receptacle assembly 20 and fuel cell stack 22 was assembled as discussed above and illustrated in FIG. 5. Each receptacle assembly 20 and fuel cell stack 22 may be individually compressed in a vertical direction as oriented in FIG. 9, and may be individually pressure tested for leaks. Upon receiving confirmation that there are no leaks in a particular fuel cell stack 22, the upper and lower end assemblies 21 can be affixed with adhesive 38 to the sides of the fuel cell stacks 22 through the gaps 32. In the illustrated embodiment, the adhesive 38 is a high tensile strength tape. Accordingly, the adhesive 38 connects the sidewalls 24, 26 to each other and to the fuel cell stack 22, and thus help retain the fuel cell stack in the stack configuration. The adhesive 38 can also retain the fuel cell stack 22 in at least a partially compressed state for a limited duration of time. During this duration, the receptacle assembly 20 can create an insulative barrier around the fuel cell stack 22 that allows the stack to be handled and moved without contaminating the stack or shorting a fuel cell.

The methods and systems of this particular embodiment have a number of advantages. For example, because the fuel cell stacks 22 can be compressed and pressure tested independently, a failed pressure test results in only a single stack being disassembled, as opposed to an entire multi-stack fuel cell assembly being disassembled. Further, the fuel stacks 22 act as uniform blocks for ease of handling and assembly. Further, the sidewalls 24, 26 serve to isolate the adjacent fuel cell stacks 22 electrically to reduce the potential for a short between the two. Further, because each end assembly 21 overlaps the other, if the fuel cell stack 22 is compressed within the receptacle assembly 20, the end assemblies will not buckle, but will instead slide with respect to each other.

Figure 10:
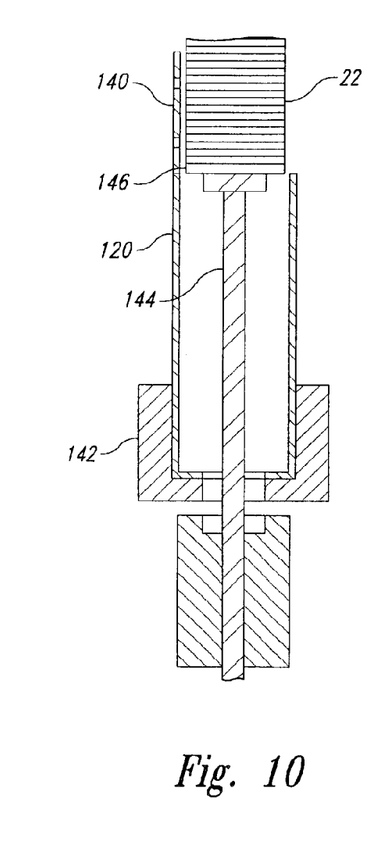
FIG. 10 is an end view schematically illustrating one step in the insertion of a fuel cell stack into a receptacle according to another embodiment of the present invention.
Figure 11:
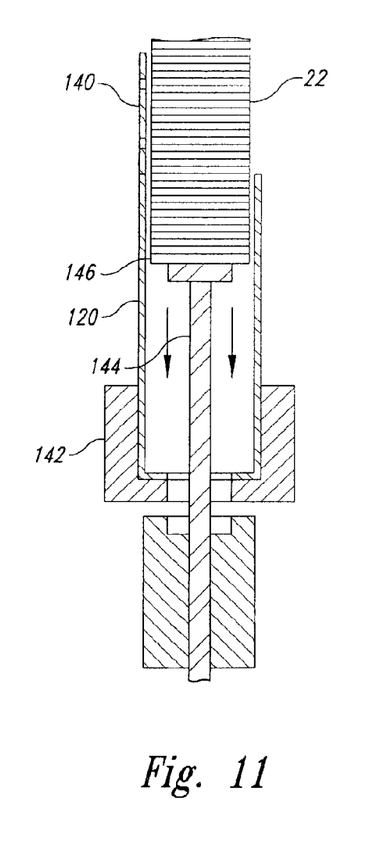
FIG. 11 is an end view schematically illustrating another step in the insertion of the fuel cell stack into the receptacle of FIG. 10.
Figure 12:
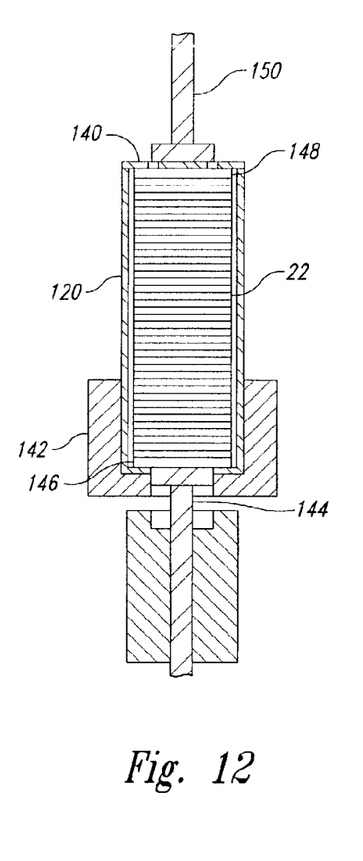
FIG. 12 is an end view schematically illustrating still another step in the insertion of the fuel cell stack into the receptacle of FIG. 10.

FIGS. 10–12 sequentially illustrate some of the steps in the assembly and compression of a receptacle assembly 120 and fuel cell stack 22 according to another embodiment of the present invention. The receptacle assembly 120 is in the form of a box having an open top for receiving the fuel cell stack 22. The receptacle assembly 120 is shaped and sized to conform with the fuel cell stack 22. As with the prior embodiment, the sides, bottom, and other portions of the receptacle assembly 120 can have openings therein for mating with external structures such as the manifold of FIG. 9. A number of straps 140 are spaced apart from each other along the width of the receptacle assembly 120.

During assembly, the receptacle assembly 120 is retained from below such as by a foundation 142. One or more pistons 144 extends through the foundation 142 and an opening in the receptacle assembly 120, and projects upward toward the top of the receptacle assembly. The piston 144 is configured to support a buss plate 146 and the buss plate is configured to engage the fuel cell stack 22. As illustrated in FIG. 11, the piston 144, and with it the buss plate 146 and fuel cell stack 22, move downward into the receptacle assembly 120.

As illustrated in FIG. 12, once the fuel cell stack 22 has been completely received by the receptacle assembly 120, an upper buss plate 148 is positioned on top of the fuel cell stack. A compression mechanism 150 compresses the fuel cell stack 22 against the foundation 142. Depending on the circumstances, the compression mechanism 150 can compress the fuel cell stack 22 at a reduced force for pressure and leak testing, or the compression mechanism can compress the fuel cell stack to full operating compression. During compression, air may escape from the receptacle assembly 120 through openings such as those designated at 30 in FIG. 5.

When the fuel cell stack 22 is compressed to the desired amount, the strap 140 or plurality of straps 140 are folded across the top of the fuel cell stack and are attached, such as by high frequency welding or other suitable means, to the opposing side of the receptacle assembly 120. Once the straps 140 are welded to the opposing sidewall of the receptacle assembly 120, the particular fuel cell stack is isolated and compressed for assembly into a multi-stack fuel cell. As discussed above, the receptacle assembly can be made from an electrically insulative material to facilitate handling and prevent the fuel cell from shorting, such as through contact with an adjacent fuel cell. In addition, the compressed fuel cell stack can be pressure-tested prior to assembly into the multi-stack fuel cell assembly.

Figure 13:
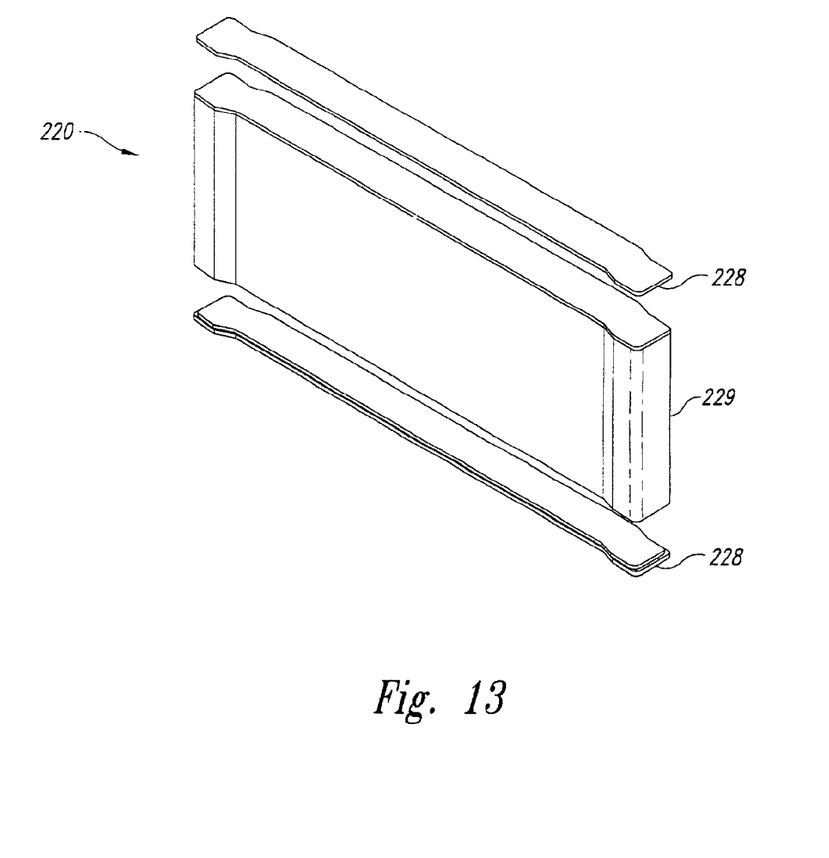
FIG. 13 is an exploded isometric view of a sidewall and a pair of opposing end caps according to yet another embodiment of the present invention.

FIG. 13 illustrates a receptacle assembly 220 according to another embodiment of the present invention. In this particular embodiment, the receptacle assembly 220 incorporates a pair of opposing end caps 228 and an intermediate sidewall 229. In the illustrated embodiment, the end caps are vacuum formed thermoplastic polymers, such as those described above, and the sidewall 229 is a continuous, extruded tube cut to the length of a compressed fuel cell stack (not shown). As discussed above, the sidewall 229 can be vacuum formed to take the shape of a fuel cell stack.

Similar to those embodiments discussed above, the end caps 228 and sidewall 229 can have various openings therein to mate with complementary external ports or openings. Likewise, the end caps can contain openings for receiving pistons and compression mechanisms to compress the fuel cell stack. Once the fuel cell stack has been compressed the desired amount, the end caps 228 can be affixed to the sidewall 229 to retain the fuel cell stack in its stack configuration and, if desired, to retain the stack under compression.

Figure 14:
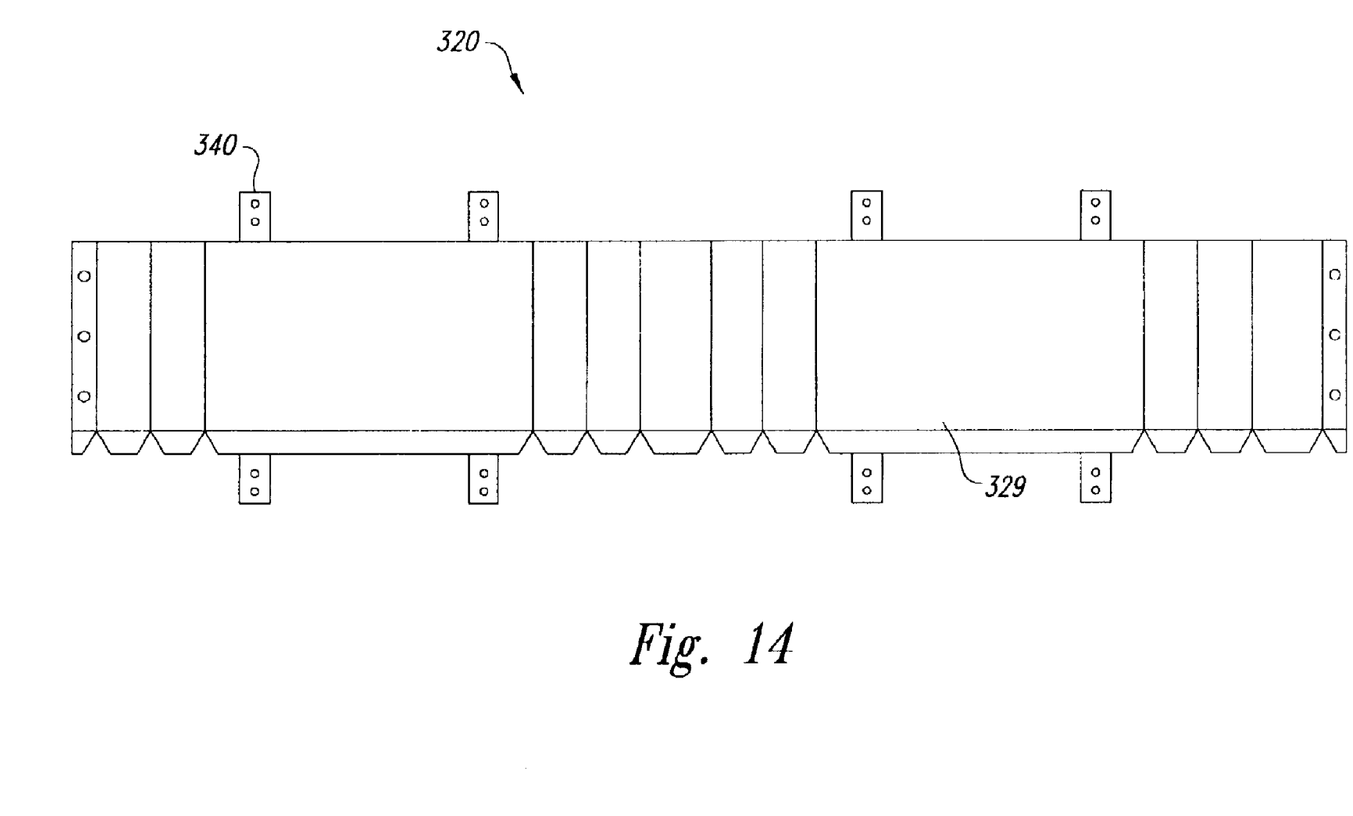
FIG. 14 is an elevation view of a pattern for a receptacle according to still another embodiment of the present invention.

FIG. 14 illustrates a receptacle assembly 320 according to another embodiment of the present invention. In this particular embodiment, the sidewall 329 is formed from a single sheet of material. The sidewall is punched or otherwise cut into a pattern that can be folded to conform to the external surface of a fuel cell stack (not shown). The folded receptacle assembly 320 can be vacuum formed and thermoplastically deformed to conform to the fuel cell stack during use.

The receptacle assembly 320 has a number of fasteners 340 oriented to extend over the top and bottom of the fuel cell stack. After being compressed in a manner similar to that described above, the fasteners 340 can be attached to opposing fasteners or to the opposing sidewall of the receptacle assembly 320 to retain the fuel cell stack in its stack configuration and, or under at least partial compression.

From the foregoing it will be appreciated that, all the specific embodiments of the invention have been described herein for purposes of illustration, various modifications may be made without deviating from the spirit and scope of the invention. Accordingly, the invention is not limited except as by the appended claims.

What is claimed is:

1. A method for fabricating a fuel cell stack, comprising:
   placing a stack of fuel cell elements in an open end of a pliable bag having the open end, an opposing closed end and a sidewall therebetween;
   compressing the fuel cell stack;
   extending a length of material over the compressed stack and across the open end of the bag; and
   attaching the length of material to the bag to retain the fuel cell stack in its stack configuration.

2. The method of claim 1 wherein placing a stack of fuel cell elements in the open end of the bag comprises separately placing each fuel cell element into the bag, one at a time.

3. The method of claim 1 wherein placing a stack of fuel cell elements in the open end of the bag comprises separately placing groups of fuel cell elements into the bag, one group at a time.

4. The method of claim 1 wherein placing a stack of fuel cell elements in the open end of the bag comprises placing the fuel cell stack onto a buss plate, then lowering the buss plate into the bag.

5. The method of claim 1, further comprising first placing a sealing element against the closed end of the bag such that the fuel cell element abutting the closed end of the bag is in sealing contact therewith.

6. The method of claim 1 wherein compressing the fuel cell stack comprises compressing the fuel cell stack while the stack is in the bag.

7. The method of claim 1 wherein the open end of the bag has a tab projecting therefrom, and wherein extending a length of material over the compressed stack and across the open end of the bag comprises folding the tab from a first location on the sidewall of the bag to a second location on the sidewall of the bag opposite the first location.

8. The method of claim 1 wherein the open end of the bag has a plurality of tabs projecting therefrom, and wherein extending a length of material over the compressed stack and across the open end of the bag comprises folding the plurality of tabs, each from a first location on the sidewall of the bag to a second location on the sidewall of the bag opposite the first location.

9. The method of claim 1 wherein extending a length of material over the compressed stack and across the open end of the bag comprises extending a band of material from the closed end of the bag.

10. The method of claim 1 wherein extending a length of material over the compressed stack and across the open end of the bag comprises extending a band of material to the closed end of the bag.

11. The method of claim 1 wherein extending a length of material over the compressed stack and across the open end of the bag comprises extending a band of material from a first location on the closed end of the bag to a second location on the closed end of the bag.

12. The method of claim 1 wherein extending a length of material over the compressed stack and across the open end of the bag comprises folding a portion of the sidewall across the stack.

13. The method of claim 1 wherein the bag further comprises a second closed end, and wherein extending a length of material over the compressed stack comprises placing the second closed end over the stack.

14. The method of claim 1 wherein attaching the length of material to the bag to retain the fuel cell stack in its stack configuration comprises tensioning the length of material such that the fuel cell stack remains at least partially compressed.

15. The method of claim 1 wherein the sidewall of the pliable bag has a height less than a corresponding height of the stack of fuel cells, and wherein extending a length of material over the compressed stack and across the open end of the bag comprises engaging a cap having a sleeve depending therefrom over the top of the stack of fuel cells such that the sleeve of the cap overlaps the sidewall of the pliable bag.

16. The method of claim 1 wherein the sidewall of the pliable bag has a height less than a corresponding height of the stack of fuel cells, and wherein extending a length of material over the compressed stack and across the open end of the bag comprises engaging a cap having a sleeve depending therefrom over the top of the stack of fuel cells such that the sleeve of the cap overlaps the sidewall of the pliable bag, and further comprising taping the sidewall of the bag to the sleeve on the cap to retain the stack in its stacked configuration.

17. The method of claim 1 wherein the sidewall of the pliable bag has a height less than a corresponding height of the stack of fuel cells, and wherein extending a length of material over the compressed stack and across the open end of the bag comprises engaging a cap having a sleeve depending therefrom over the top of the stack of fuel cells such that the sleeve of the cap overlaps the sidewall of the pliable bag, and further comprising tensioning the sidewall and the sleeve away from their respective ends and taping the sidewall of the bag to the sleeve on the cap to retain the stack in its stacked configuration under at least partial compression.

18. A method for assembling a plurality of fuel cells, comprising:
   compressing each of the fuel cell stacks;
   wrapping a pliable material around each of the stacks of fuel cells to retain the stacks in their stacked configuration; and
   placing the plurality of stacks between a pair of manifolds.

19. The method of claim 18 wherein the pliable material is an electrically insulative material, and wherein wrapping the material around each of the stacks comprises covering a sidewall of the stack that faces an adjacent stack when the stacks are positioned between the pair of manifolds.

20. The method of claim 18, further comprising pressure testing each of the stacks prior to placing the stacks between the pair of manifolds.

21. The method of claim 18 wherein wrapping a material around each of the stacks comprises tensioning the material to retain the stack under at least partial compression.

22. The method of claim 18 wherein wrapping the fuel cell stacks comprises first partially wrapping the fuel cell stacks prior to compressing them, then completing the wrapping to encircle at least a portion of the stack.

23. The method of claim 18 wherein wrapping the fuel cell stacks comprises encasing each stack in a bottom cap and sidewalls, and extending a length of material over the stack from one portion of the sidewall to another portion of the sidewall.

24. The method of claim 18 wherein wrapping the fuel cell stacks comprises encasing each stack in a bottom cap and sidewalls, and extending a plurality of lengths of material over the stack from one portion of the sidewall to another portion of the sidewall.

25. The method of claim 18 wherein wrapping the fuel cell stacks comprises encasing each stack in a bottom cap and sidewalls, and folding a portion of the sidewall across the stack to an opposing portion of the sidewall.

26. The method of claim 18 wherein wrapping the fuel cell stacks comprises encasing one end of each stack in a bottom cap having sidewalls depending therefrom, and engaging the other end of each stack in a top cap having a sleeve depending therefrom, such that at least a portion of the sleeve overlaps at least a portion of the sidewall.

27. The method of claim 18 wherein wrapping the fuel cell stacks comprises forming sidewalls to closely conform with each stack, coupling the sidewalls to an end cap, and folding a portion of the sidewall across the stack to an opposing portion of the sidewall.

28. The method of claim 18 wherein wrapping the fuel cell stacks comprises forming sidewalls to closely conform with each stack and coupling the sidewalls to an end cap.

29. The method of claim 18, further comprising taping one portion of the material to another portion of the material to retain the material in close conformity with the stack.

30. The method of claim 18, further comprising tensioning the material around at least a portion of each of the stacks, then taping one portion of the material to another portion of the material to retain the stack in at least partial compression.

31. A receptacle for receiving and retaining a fuel cell stack in its stacked configuration during fabrication of a multi-stack fuel cell assembly having a manifold, the receptacle comprising:
  an end cap having a plurality of openings therein configured to allow the fuel cell stack to communicate with a corresponding plurality of openings in the manifold;
  a pliable sidewall sized and shaped to insulate the fuel cell stack from at least one adjacent fuel cell stack when the multi-stack fuel cell assembly has been assembled; and
  a fastener configured to extend from one location on the sidewall across the end of the fuel cell stack opposite the end cap and to be attached to another location on the sidewall to retain the fuel cell stack in its stacked configuration.

32. The receptacle of claim 31 wherein the end cap is formed to conform to the shape of an end of the fuel cell stack.

33. The receptacle of claim 31 wherein the end cap comprises a thermoplastic resin that is vacuum formed to conform to the shape of and end of the fuel cell stack.

34. The receptacle of claim 31 wherein an internal surface of the end cap comprises a seal around at least one of the openings, the seal being configured to sealably engage a port on the fuel cell stack to reduce the likelihood of leakage between the fuel cell stack and the manifold.

35. The receptacle of claim 31 wherein the sidewall is coupled to the end cap.

36. The receptacle of claim 31 wherein the sidewall is configured to encircle at least a substantial portion of a corresponding sidewall on the fuel cell stack.

37. The receptacle of claim 31 wherein the fastener comprises an elongated band of pliable material having a length sufficient to extend across the top of the fuel cell stack and overlap an opposing portion of the sidewall.

38. The receptacle of claim 31 wherein the fastener comprises a plurality of elongated bands of pliable material, each band having a length sufficient to extend across the top of the fuel cell stack and overlap an opposing portion of the sidewall.

39. The receptacle of claim 31 wherein the fastener comprises a portion of the sidewall sufficiently tall to project beyond a corresponding top of the fuel cell stack when the fuel cell stack is engaged with the receptacle, such that the portion of the sidewall can be folded across the top of the fuel cell stack and overlap at least a portion of an opposing portion of the sidewall.

* * * * *